(12) United States Patent
Dai et al.

(10) Patent No.: US 7,865,736 B2
(45) Date of Patent: Jan. 4, 2011

(54) SYSTEM AND METHOD FOR ENHANCING ENVIRONMENT VARIABLE AND PROCESS OPTION INVOCATION

(75) Inventors: David Z. Dai, Austin, TX (US); Vasu Vallabhaneni, Austin, TX (US); Richard P. Youngman, Mililani, HI (US); Ine Youngman, legal representative, Mililani, HI (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 11/554,384

(22) Filed: Oct. 30, 2006

(65) Prior Publication Data

US 2008/0104395 A1 May 1, 2008

(51) Int. Cl.
*G06F 15/16* (2006.01)
(52) U.S. Cl. .................. 713/182; 713/183; 713/184; 713/185; 715/750; 715/741
(58) Field of Classification Search ......... 713/182–185; 715/741, 750
See application file for complete search history.

(56) References Cited

U.S. PATENT DOCUMENTS 6,240,414 B1 * 5/2001 Beizer et al. .................. 707/8

OTHER PUBLICATIONS

*System Management Concepts: Operating System and Devices;* "System Resource Controller Overview" http:www.ncsa.uiuc.edu/UserInfo/Resources/Hardware/IBMp690/IBM/usr/share/man/info/en_US/a_doc_lib/aixbman/admnconc/sys_res_overview.htm.

* cited by examiner

*Primary Examiner*—Abdelmoniem Elamin
(74) *Attorney, Agent, or Firm*—Dillon & Yudell LLP

(57) ABSTRACT

A method, system, and computer-usable medium for enhancing environment variable and process option invocation in a data processing system. In a preferred embodiment of the present invention, in response to receiving a request for a system startup, an operating system loads a centralized environment file. In response to receiving a request for a user login, the operating system searches for a user environment file. In response to determining that the user environment file conflicts with the centralized environment file, the operating system overrides the user environment file with settings from the centralized environment file.

15 Claims, 4 Drawing Sheets

SYSTEM AND METHOD FOR ENHANCING ENVIRONMENT VARIABLE AND PROCESS OPTION INVOCATION

BACKGROUND OF THE INVENTION

1. Technical Field

The present invention relates in general to the field of data processing systems. Still more particularly, the present invention relates to a system and method for enhancing environment variable and process option invocation.

2. Description of the Related Art

Starting UNIX processes from system/user production scripts involve issues that limit management of process environments and result in complex usage issues. An example of a system/user production script would be the AIX scripts that involve the system resource master controller daemon (srcmstr). Currently, environment variables are defined at the system (e.g., universal for all users) level or at the single-user level via the user's home directory. All processes that are started from a single script will have the same set of environment variables from the system and user levels. Process options are global in that users of a system script do not have a convenient method for invoking a process with alternate options. Therefore, there is a need for a system and method for addressing the aforementioned limitations of the prior art.

SUMMARY OF THE INVENTION

The present invention includes a method, system, and computer-usable medium for enhancing environment variable and process option invocation in a data processing system. In a preferred embodiment of the present invention, in response to receiving a request for a system startup, an operating system loads a centralized environment file. In response to receiving a request for a user login, the operating system searches for a user environment file. In response to determining that the user environment file conflicts with the centralized environment file, the operating system overrides the user environment file with settings from the centralized environment file.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1A:
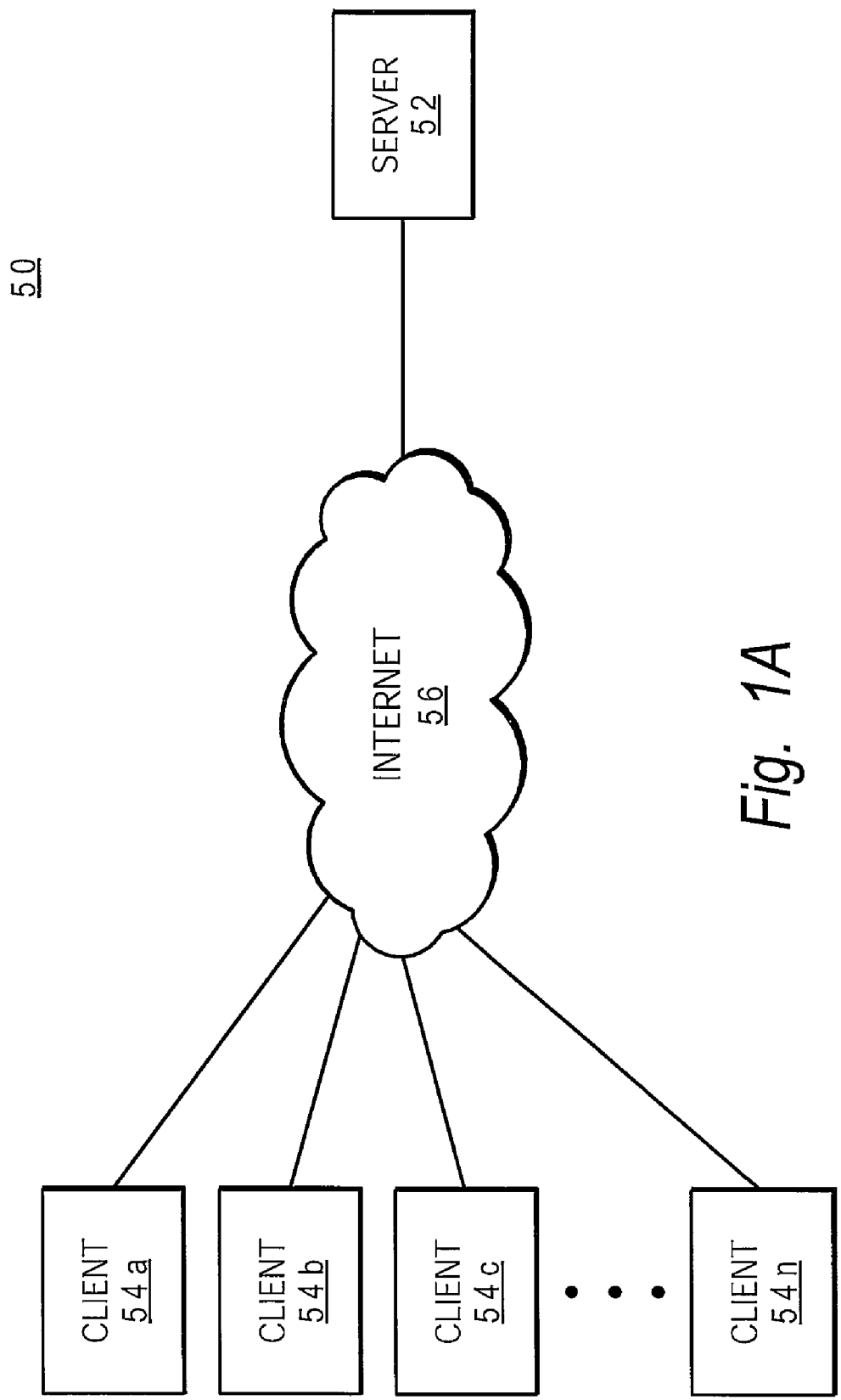
FIG. 1A is a block diagram depicting an exemplary network in which a preferred embodiment of the present invention may be implemented.

Referring now to the figures, and in particular, referring to FIG. 1A, there is illustrated an exemplary network 50 in which a preferred embodiment of the present invention may be implemented. As depicted, network 50 includes a server 52 coupled to clients 54a-54n via Internet 56. Those with skill in the art will appreciate that Internet 56 may also be implemented as a wide-area or a local-area network. Clients 54a-54n are connected to server 52 to upload to and download information from server 52. To enable a client (e.g., client 54a) to connect to server 52, the client must log-on to server 54 via a login protocol that identifies and verifies the identity of the client.

Figure 1B:
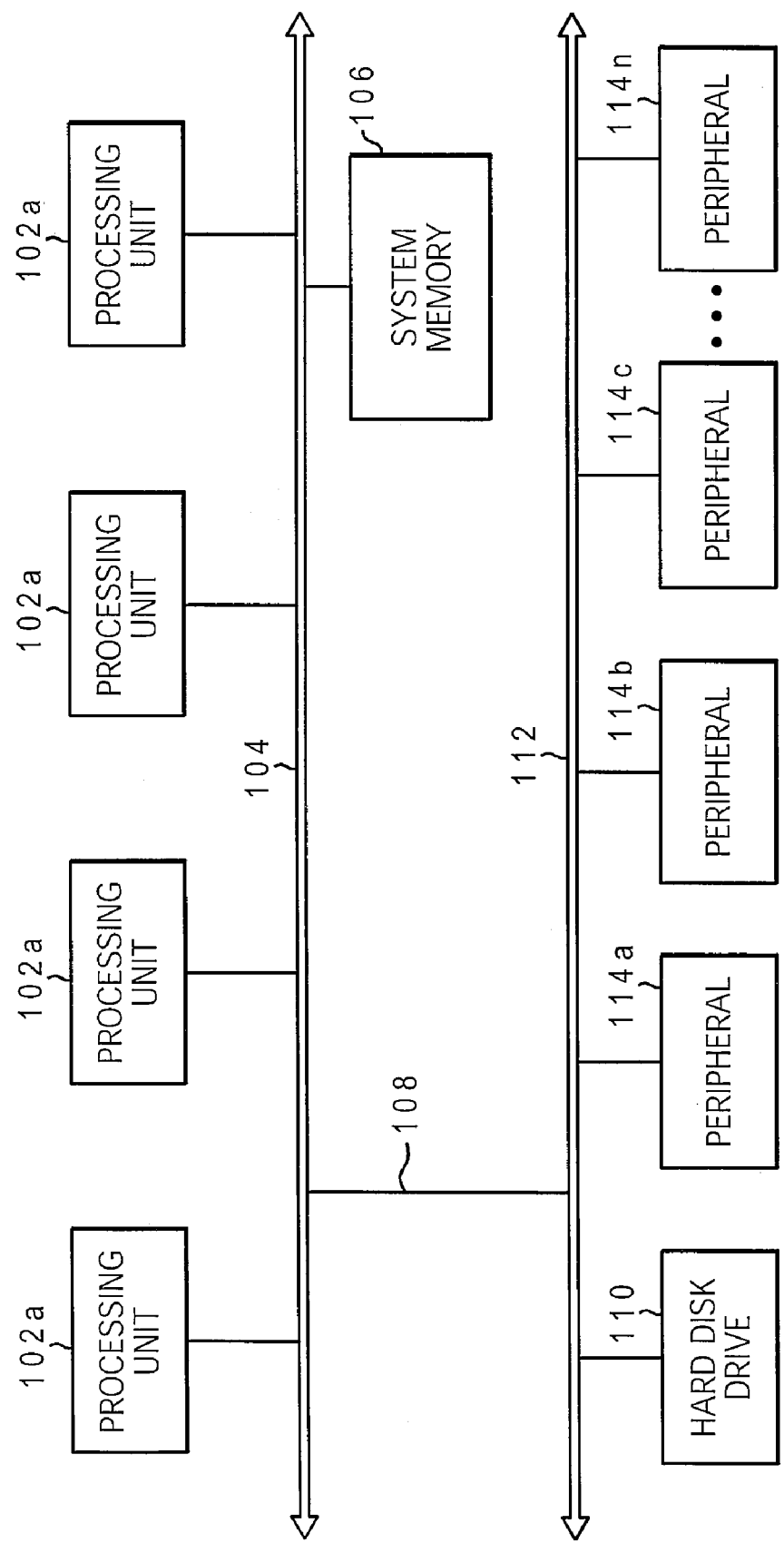
FIG. 1B is a block diagram illustrating an exemplary data processing system in which a preferred embodiment of the present invention may be implemented.

With reference to FIG. 1B, there is illustrated an exemplary data processing system 100, which may be utilized to implement server 52 and clients 54a-n of network 50 as shown in FIG. 1. As illustrated, data processing system 100 includes a collections of processing units 102a-n, which are coupled to system memory 106 via a system interconnect 104. System interconnect 104 is coupled to peripheral interconnect 112 via mezzanine interconnect 108. Those with skill in the art will appreciate that peripheral interconnect 112 may be implemented by any type of interconnect including, but not limited to: peripheral component interconnect (PCI) bus, advanced graphics port (AGP), small computer system interface (SCSI), etc. Coupled to peripheral interconnect 112 is a hard disk drive 110 for mass storage and a collection of peripherals 114a-114n, which may include, but are not limited to: optical drives, other hard disk drives, printers, input devices, etc.

Those with skill in the art will appreciate that data processing system 100 can include many additional components not specifically illustrated in FIG. 1B. Because such additional components are not necessary for an understanding of the present invention, they are not illustrated in FIG. 1B or discussed further herein. It should be understood, however, that the enhancements to data processing system 100 for enhancing environment variable and process option invocation provided by the present invention are applicable to data processing systems of any system architecture and are in no way limited to the generalized multi-processor architecture or symmetric multi-processing (SMP) architecture illustrated in FIG. 1B.

Figure 2:
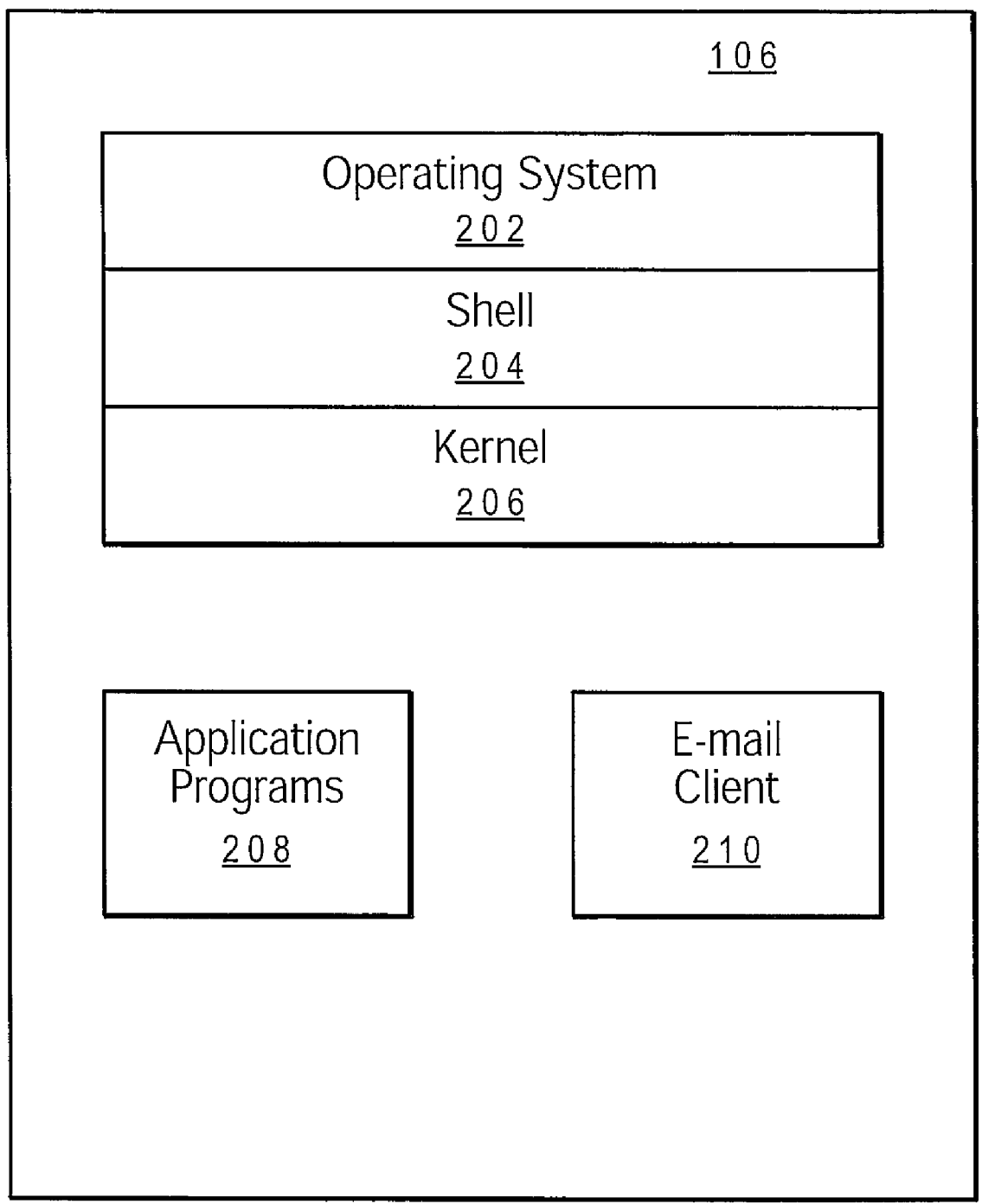
FIG. 2 is a block diagram depicting exemplary contents of a system memory according to a preferred embodiment of the present invention.

FIG. 2 is a block diagram illustrating exemplary contents of system memory 106 of data processing system 100, according to a preferred embodiment of the present invention. As shown, system memory 106 includes operating system 202, which further includes shell 204 for providing transparent user access to resources such as application programs 208. Generally, shell 204 is a program that provides an interpreter and an interface between the user and the operating system. More specifically, shell 204 executes commands that are entered into a command line user interface or a file. Thus, shell 204 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 206) for processing. Note that while shell 204 is a text-based, line-oriented user interface, the present invention will support other user interface modes, such as graphical, voice, gestural, etc. equally well.

As illustrated, operating system 202 also includes kernel 206, which includes lower levels of functionality for operating system 202 and application programs 208, including memory management, process and task management, disk management, and mouse and keyboard management. Application programs 208 can include a browser, utilized for access to Internet 56, world processors, spreadsheets, and other application programs Also, as depicted in FIG. 2, operating system 202 interacts with a centralized env file 210 (/etc/.env), which includes the centralized environment variables and process options for different users. The stanza format in this file can be:

user_name process_name env_name=val user_name process options

Also, for each user, there can be one user env file 212a-212n (e.g., for user "david", the user env file is listed under /home/david/.env), which includes user-specific environment variables and process options. The stanza format in this file can be:

Process_name env_name=val

Process_name options

Figure 3:
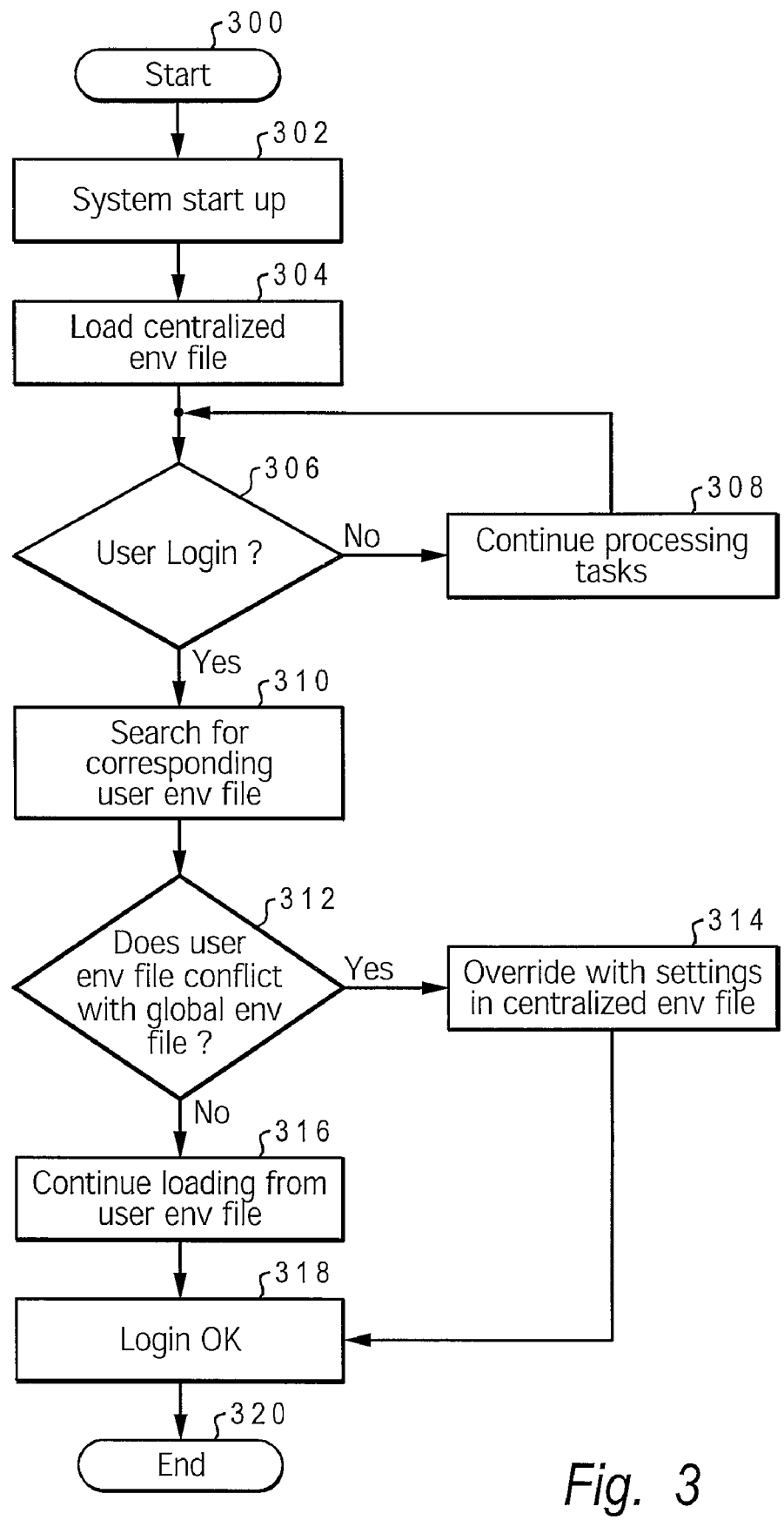
FIG. 3 is a high-level logical flowchart depicting an exemplary method for enhancing environment variable and process option invocation.

FIG. 3 is a high-level logical flowchart diagram showing an exemplary method for enhancing environment variable and process option invocation according to a preferred embodiment of the present invention. The process begins at step 300 and proceeds to step 302, which illustrates server 52 entering a startup mode. The process continues to step 304, which depicts server 52 loading a centralized env file 210 that enables a system administrator to set environment variables. The process proceeds to step 306, which illustrates server 52 determining if a client 52a-52n is attempting to log into server 52. If server 52 determines that no login processes have been initiated, the process continues to step 308, which depicts server 52 continue processing tasks queued in server memory. The process returns to step 306 and proceeds in an iterative fashion.

Returning to step 306, if server 52 determines that at least one client 52a-52n is attempting to log into server 52, the process continues to step 310, which illustrates server 52 searching for a corresponding user env file 212a-212n in system memory 106. The process proceeds to step 312, which shows server 52 determining if user env file 212a-212n conflicts with any setting within global env file 210. If user env file 212a-212n conflicts with any setting within centralized env file 210, the process proceeds to step 314, which illustrates server 52 overriding with settings specified within global env file 210. The process proceeds to step 318, which illustrates that the user has successfully logged into a command shell. The process continues to step 320, which shows the process ending.

Returning to step 312, if server 52 determines that there are no conflicts between centralized env file 210 and user env file 212a-212n, the process continues to step 316, which shows server 52 continue loading the settings from user env file 212a-212n. The process proceeds to step 318, which illustrates that the user has successfully logged into a command shell. The process continues to step 320, which depicts the process ending.

As discussed, the present invention includes a method, system, and computer-usable medium for enhancing environment variable and process option invocation in a data processing system. In a preferred embodiment of the present invention, in response to receiving a request for a system startup, an operating system loads a centralized environment file. In response to receiving a request for a user login, the operating system searches for a user environment file. In response to determining that the user environment file conflicts with the centralized environment file, the operating system overrides the user environment file with settings from the centralized environment file.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access Memory (RAM), and communication media, such as computer and telephone networks including Ethernet, the Internet, wireless networks, and like network systems. It should be understood; therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, mainframe computers, routers, switches, personal digital assistants (PDAs), telephones, and any other system capable of processing, transmitting, receiving, capturing and/or storing data.

What is claimed is:

1. A computer-implementable method comprising:

in response to receiving a request for a system startup, loading a centralized environment file;

in response to receiving a request for a user login, searching for a user environment file; and in response to determining that said user environment file conflicts with said centralized environment file, override said user environment file with settings from said centralized environment file.

2. The computer-implementable method according to claim 1, wherein said centralized environment file includes a plurality of centralized environment variables a plurality of centralized environment process options for a plurality of users.

3. The computer-implementable method according to claim 2, wherein said centralized environment file includes a stanza format of:

user$_{13}$ name process_name env_name=val; and user$_{13}$ name process options.

4. The computer-implementable method according to claim 1, wherein said user environment file includes a plurality of user-specific environment variables and a plurality of user-specific process options.

5. The computer-implementable method according to claim 4, wherein said user environment file includes a stanza format of:

Process$_{13}$ name env$_{13}$ name=val; and

Process_name options.

6. A system comprising:
a processor;
a data bus coupled to said processor; and
a computer-readable storage medium embodying computer program code, said computer-readable storage medium being coupled to said data bus, said computer program code comprising instructions executable by said processor and configured for:
  in response to receiving a request for a system startup, loading a centralized environment file;
  in response to receiving a request for a user login, searching for a user environment file; and
  in response to determining that said user environment file conflicts with said centralized environment file, override said user environment file with settings from said centralized environment file.

7. The system according to claim 6, wherein said centralized environment file includes a plurality of centralized environment variables a plurality of centralized environment process options for a plurality of users.

8. The system according to claim 7, wherein said centralized environment file includes a stanza format of:
  $user_{13}$ name $process_{13}$ name $env_{13}$ name=val; and
  $user_{13}$ name process options.

9. The system according to claim 6, wherein said user environment file includes a plurality of user-specific environment variables and a plurality of user-specific process options.

10. The system according to claim 9, wherein said user environment file includes a stanza format of:
  $Process_{13}$ name $env_{13}$ name=val; and
  $Process_{13}$ name options.

11. A computer-usable storage medium embodying computer program code, said computer program code comprising computer-executable instructions configured for:
  in response to receiving a request for a system startup, loading a centralized environment file;
  in response to receiving a request for a user login, searching for a user environment file; and
  in response to determining that said user environment file conflicts with said centralized environment file, override said user environment file with settings from said centralized environment file.

12. The computer-usable storage medium according to claim 11, wherein said centralized environment file includes a plurality of centralized environment variables a plurality of centralized environment process options for a plurality of users.

13. The computer-usable storage medium according to claim 12, wherein said centralized environment file includes a stanza format of:
  $user_{13}$ name $process_{13}$ name $env_{13}$ name=val; and
  $user_{13}$ name process options.

14. The computer-usable storage medium according to claim 11, wherein said user environment file includes a plurality of user-specific environment variables and a plurality of user-specific process options.

15. The computer-usable storage medium according to claim 14, wherein said user environment file includes a stanza format of:
  $Process_{13}$ name $env_{13}$ name=val; and
  Process_name options.

* * * * *